(12) United States Patent
Damiba (10) Patent No.: US 7,069,513 B2
(45) Date of Patent: Jun. 27, 2006

(54) SYSTEM, METHOD AND COMPUTER PROGRAM PRODUCT FOR A TRANSCRIPTION GRAPHICAL USER INTERFACE

(75) Inventor: Bertrand A Damiba, Sunnyvale, CA (US)

(73) Assignee: BeVocal, Inc., Sunnyvale, CA (US)

( * ) Notice: Subject to any disclaimer, the term of this patent is extended or adjusted under 35 U.S.C. 154(b) by 369 days.

(21) Appl. No.: 09/769,638

(22) Filed: Jan. 24, 2001

(65) Prior Publication Data

US 2002/0135609 A1 Sep. 26, 2002

(51) Int. Cl.
*G06F 13/00* (2006.01)
*G06F 5/00* (2006.01)
(52) U.S. Cl. .................. 715/738; 715/853; 715/854
(58) Field of Classification Search ................ 345/723, 345/786, 724, 725, 853, 726, 973; 715/723, 715/786, 764, 853, 726, 737, 738, 854, 760; 704/243, 245
See application file for complete search history.

(56) References Cited

U.S. PATENT DOCUMENTS

| 4,581,755 | A | 4/1986 | Sakoe |
| 5,353,377 | A | 10/1994 | Kuroda et al. |
| 5,638,425 | A | 6/1997 | Meador, III et al. |
| 5,732,394 | A | 3/1998 | Nakadai et al. |
| 6,044,322 | A | 3/2000 | Stieler |
| 6,073,096 | A | 6/2000 | Gao et al. |
| 6,138,094 | A | 10/2000 | Miet et al. |
| 6,477,493 | B1 * | 11/2002 | Brooks et al. ............... 704/246 |
| 6,538,665 | B1 * | 3/2003 | Crow et al. .................. 345/723 |

FOREIGN PATENT DOCUMENTS

JP 8274680 A2 10/1996

* cited by examiner

*Primary Examiner*—Cao (Kevin) Nguyen
(74) *Attorney, Agent, or Firm*—Zilka-Kotab, PC (57) ABSTRACT

A system, method and computer program product are afforded for providing a transcription graphical user interface. Initially, an utterance icon is displayed for prompting the emission of an utterance via a speaker upon the selection thereof. Further, a transcription field is depicted for allowing entry of a transcription of the utterance utilizing a keyboard. In use, the present transcription graphical user interface is displayed using hypertext markup language (HTML).

19 Claims, 8 Drawing Sheets

SYSTEM, METHOD AND COMPUTER PROGRAM PRODUCT FOR A TRANSCRIPTION GRAPHICAL USER INTERFACE

RELATED APPLICATIONS

The present application is related to a co-pending application which was filed concurrently herewith under the title "SYSTEM, METHOD AND COMPUTER PROGRAM PRODUCT FOR A DISTRIBUTED SPEECH RECOGNITION TUNING PLATFORM" which is incorporated herein by reference in its entirety.

FIELD OF THE INVENTION

The present invention relates to speech recognition, and more particularly to tuning speech recognition software.

BACKGROUND OF THE INVENTION

Techniques for accomplishing automatic speech recognition (ASR) are well known. Among known ASR techniques are those that use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

Products and services that utilize some form of automatic speech recognition ("ASR") methodology have been recently introduced commercially. For example, AT&T has developed a grammar-based ASR engine called WATSON that enables development of complex ASR services. Desirable attributes of complex ASR services that would utilize such ASR technology include high accuracy in recognition; robustness to enable recognition where speakers have differing accents or dialects, and/or in the presence of background noise; ability to handle large vocabularies; and natural language understanding. In order to achieve these attributes for complex ASR services, ASR techniques and engines typically require computer-based systems having significant processing capability in order to achieve the desired speech recognition capability. In addition to WATSON, numerous ASR services are available which are typically based on personal computer (PC) technology.

One of the fundamental problem areas in speech and language research, particularly with regards to perception, cognition and artificial intelligence, concerns the adaptive tuning of recognition mechanisms, and the manner in which such tuning can alter the groupings which emerge within a context of familiar elements. Adaptive tuning of recognition processes is one of the mechanisms whereby representations become unitized or chunked into coherent recognition codes through experience.

Packet networks are general-purpose data networks which are well-suited for sending stored data of various types, including speech or audio. The Internet, the largest and most renowned of the existing packet networks, connects over 4 million computers in some 140 countries. The Internet's global and exponential growth is common knowledge today.

Typically, one accesses a packet network, such as the Internet, through a client software program executing on a computer, such as a PC, and so packet networks are inherently client/server oriented. One way of accessing information over a packet network is through use of a Web browser (such as the Netscape Navigator, available from Netscape Communications, Inc., and the Internet Explorer, available from Microsoft Corp.) which enables a client to interact with Web servers. Web servers and the information available therein are typically identified and addressed through a Uniform Resource Locator (URL)-compatible address. URL addressing is widely used in Internet and intranet applications and is well known to those skilled in the art (an "intranet" is a packet network modeled in functionality based upon the Internet and is used, e.g., by companies locally or internally).

There is a thus a need to utilize a packet switched network such as the Internet to overcome some of the problems with speech recognition.

DISCLOSURE OF THE INVENTION

A system, method and computer program product are afforded for providing a transcription graphical user interface. Initially, an utterance icon is displayed for prompting the emission of an utterance via a speaker upon the selection thereof. Further, a transcription field is depicted for allowing entry of a transcription of the utterance utilizing a keyboard. In use, the present transcription graphical user interface is displayed using hypertext markup language (HTML).

In one embodiment of the present invention, a comment field may be depicted for allowing entry of comments associated with the transcription utilizing the keyboard. Moreover, the transcription graphical user interface may be capable of being displayed over a network utilizing a network browser.

In another aspect of the present invention, a pair of selection icons may be displayed for prompting the emission of previous and next utterances. Optionally, a hint may displayed corresponding to the utterance. Further, the hint may correspond to a word matched with the utterance utilizing a speech recognition process.

The present invention thus provides the ability to decentralize a workforce and distribute work to in a cheaper manner.

DESCRIPTION OF THE PREFERRED EMBODIMENTS

Figure 1:
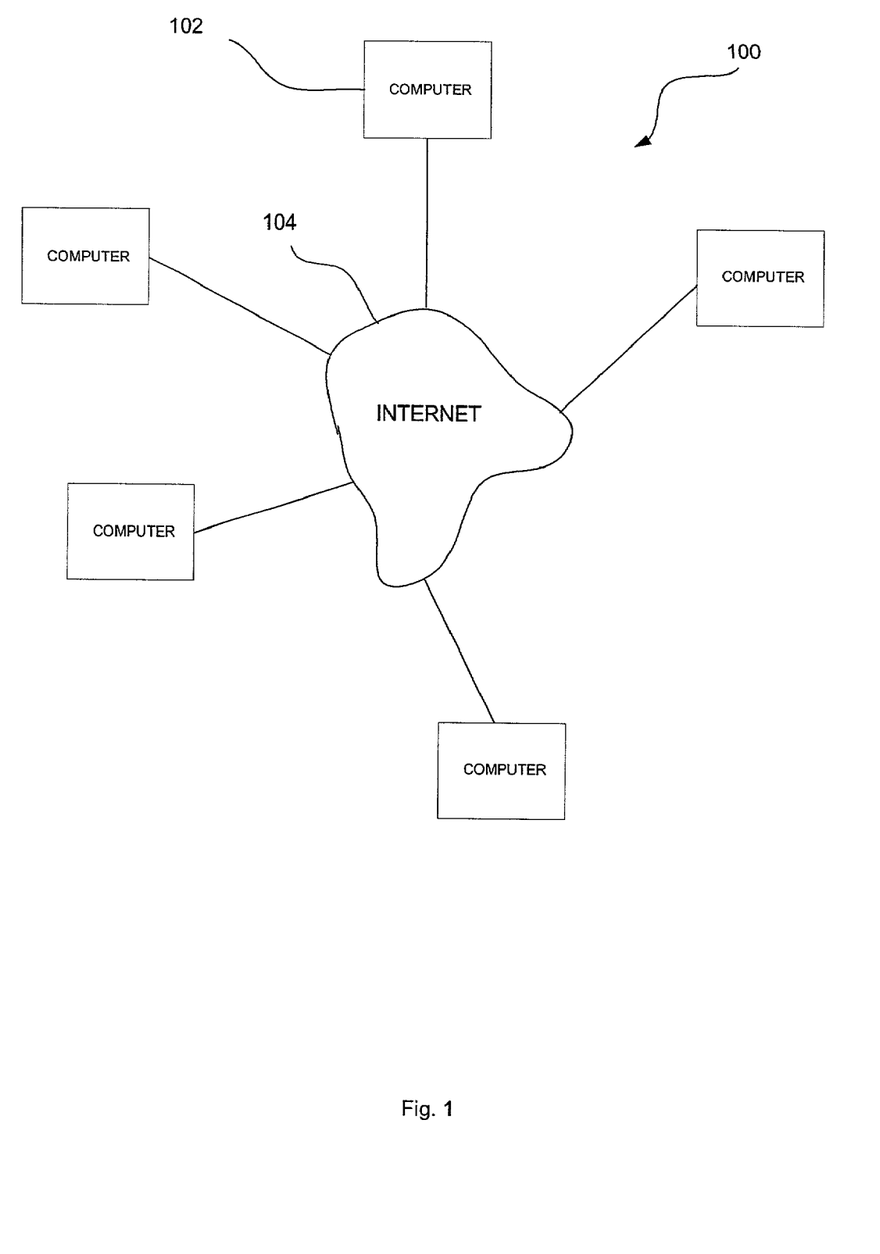
FIG. 1 illustrates an exemplary environment in which the present invention may be implemented.

FIG. 1 illustrates an exemplary environment 100 in which the present invention may be implemented. As shown, a plurality of computers 102 are interconnected via a network 104. In one embodiment, such network includes the Internet. It should be noted, however, that any type of network may be employed, i.e. local area network (LAN), wide area network (WAN), etc.

Figure 2:
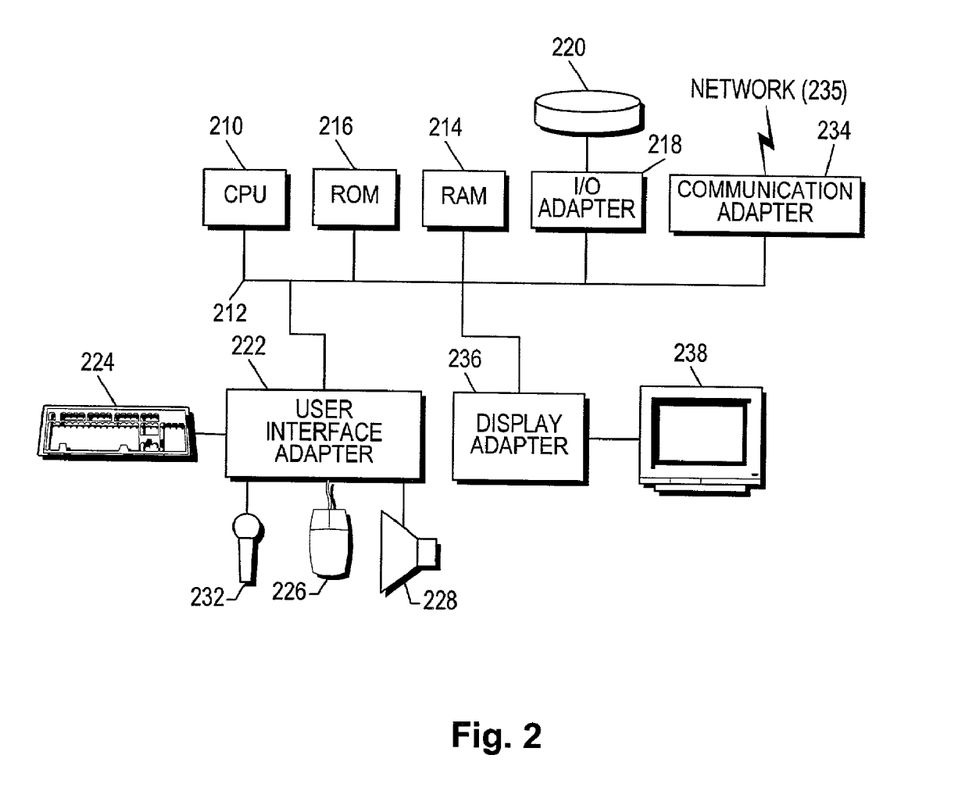
FIG. 2 shows a representative hardware environment associated with the computer systems of FIG. 1.

FIG. 2 shows a representative hardware environment associated with the computer systems 102 of FIG. 1. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small-scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Bemers-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
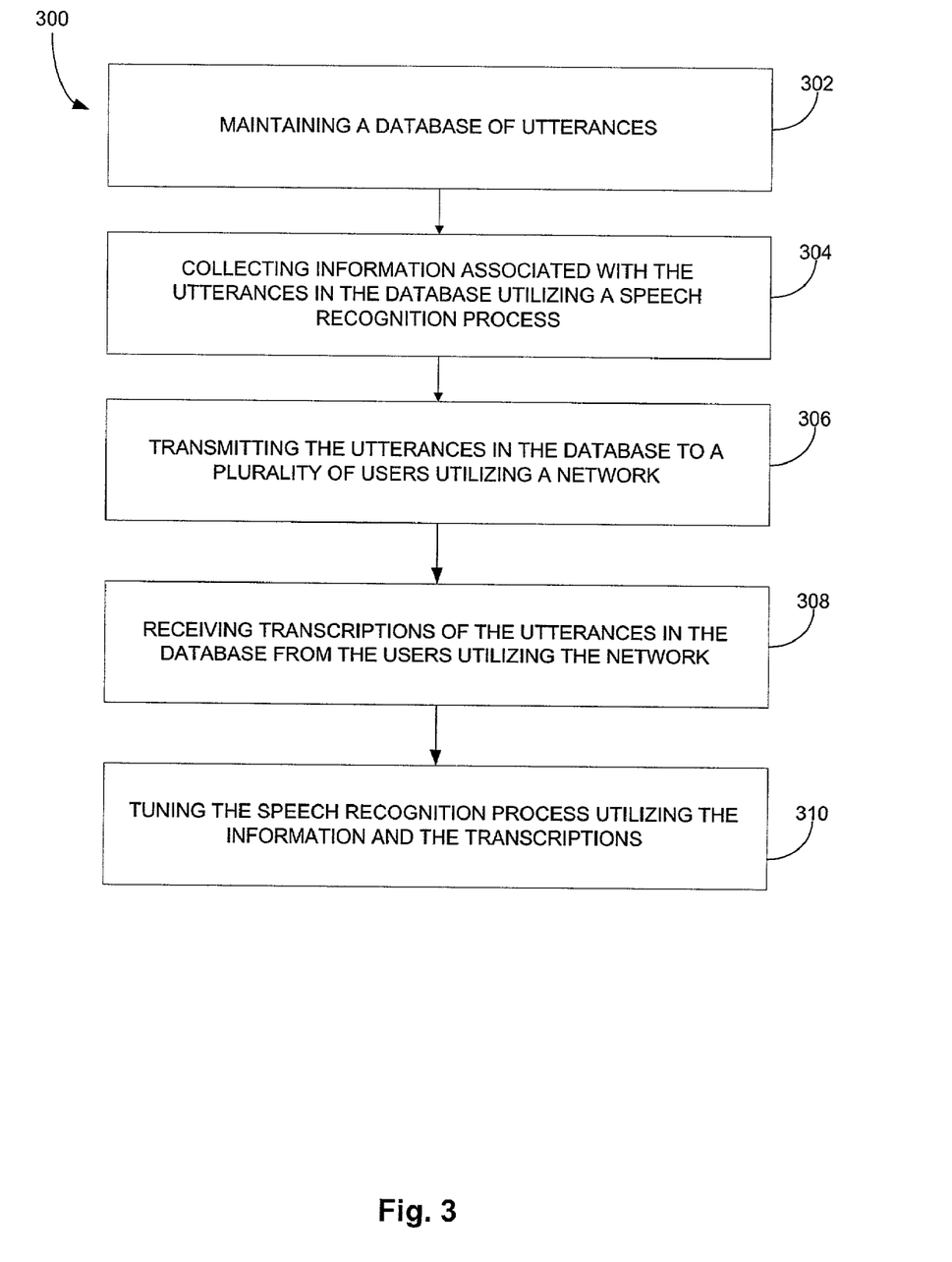
FIG. 3 illustrates a method for tuning a speech recognition process.

FIG. 3 illustrates a method 300 for tuning a speech recognition process. Initially, a database of utterances is maintained. See operation 302. In operation 304, information associated with the utterances is collected utilizing a speech recognition process. When a speech recognition process application is deployed, audio data and recognition logs may be created. Such data and logs may also be created by simply parsing through the database at any desired time.

In one embodiment, a database record may be created for each utterance. Table 1 illustrates the various information that the record may include.

TABLE 1

Name of the grammar it was recognized against;
Name of the audio file on disk;
Directory path to that audio file;
Size of the file (which in turn can be used to calculate the length of the utterance if the sampling rate is fixed);
Session identifier;
Index of the utterance (i.e. the number of utterances said before in the same session);
Dialog state (identifier indicating context in the dialog flow in which recognition happened);
Recognition status (i.e. what the recognizer did with the utterance (rejected, recognized, recognizer was too slow);
Recognition confidence associated with the recognition result; and/or
Recognition hypothesis;
Gender of the speaker;
Identification of the transcriber; and/or
Date the utterances were transcribed.

Inserting utterances and associated information in this fashion in the database (SQL database) allows instant visibility into the data collected. Table 2 illustrates the variety of information that may be obtained through simple queries.

TABLE 2

Number of collected utterances;
Percentage of rejected utterances for a given grammar;
Average length of an utterance;
Call volume in a give data range;
Popularity of a given grammar or dialog state; and/or
Transcription management (i.e. transcriber's productivity).

Further, in operation 306, the utterances in the database are transmitted to a plurality of users utilizing a network. As such, transcriptions of the utterances in the database may be received from the users utilizing the network. Note operation 308. As an option, the transcriptions of the utterances may be received from the users using a network browser.

Figure 4:
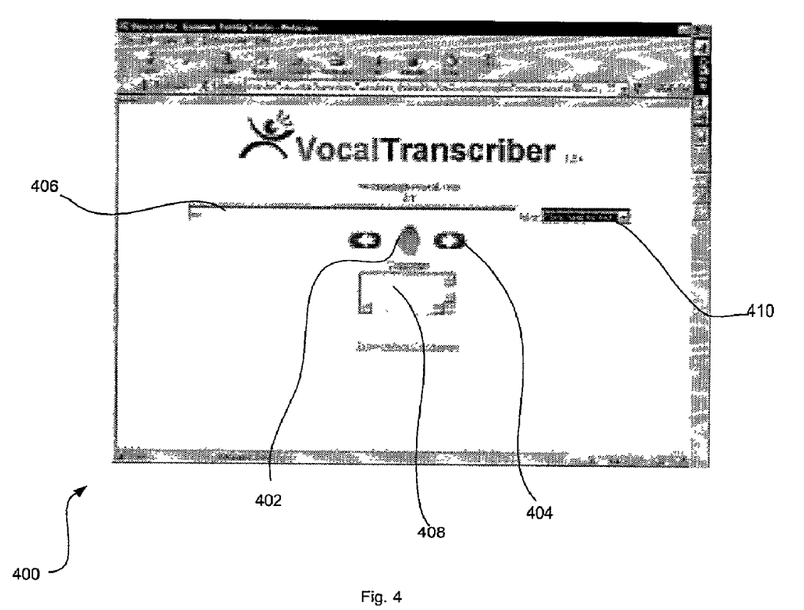
FIG. 4 illustrates a web-based interface that may be used which interacts with a database to enable and coordinate the audio transcription effort.

FIG. 4 illustrates a web-based interface 400 that may be used which interacts with the database to enable and coordinate the audio transcription effort. As shown, a speaker icon 402 is adapted for emitting a present utterance upon the selection thereof. Previous and next utterances may be queued up using selection icons 404. Upon the utterance being emitted, a local or remote user may enter a string corresponding to the utterance in a string field 406. Further, comments (re. transcriber's performance) may be entered regarding the transcription using a comment field 408. Such comments may be stored for facilitating the tuning effort, as will soon become apparent.

As an option, the web-based interface 400 may include a hint pull down menu 410. Such hint pull down menu 410 allows a user choose from a plurality of strings identified by the speech recognition process in operation 304 of FIG. 3. This allows the transcriber to do a manual comparison between the utterance and the results of the speech recognition process. Comments regarding this analysis may also be entered in the comment field 408.

The web-based interface 400 thus allows anyone with a web-browser and a network connection to contribute to the tuning effort. During use, the interface 400 is capable of playing collected sound files to the authenticated user, and allows them to type into the browser what they hear. Making the transcription task remote simplifies the task of obtaining quality transcriptions of location specific audio data (street names, city names, landmarks). The order in which the utterances are fed to the transcribers can be tweaked by a transcription administrator (e.g. to favor certain grammars, or more recently collected utterances). This allows for the transcribers work to be focused on the areas needed.

Similar to the speech recognition process of operation 304 of FIG. 3, the present interface 400 of FIG. 4 and the transcription process contribute information for use during subsequent tuning. Table 3 illustrates various fields of information that may be associated with each utterance record in the database.

TABLE 3

Date the utterance was transcribed;
Identifier of the transcriber;
Transcription text;
Transcription comments noting speech anomalies and/or
Gender identifier.

Equipped with a human transcription associated with each utterance, and not just a recognition result, an even deeper visibility in the data is enabled. Table 4 illustrates various data that may be collected by simple SQL queries.

TABLE 4

Percentages of utterance in which users have said a certain word;
Number of transcribed utterances; and
Number of utterances transcribed by a particular transcriber.

In use, the speech recognition process may be tuned utilizing the information and the transcriptions. See operation 308 of FIG. 3. Such tuning may be accomplished by performing experiments based on the information. Through simple queries, one can extract grammar specific transcript files, date specific transcription files, etc.

In one embodiment, another web-based interface to an offline recognition tool may be provided which allows for anyone with a web browser and a password to run recognition experiments, leveraging the power of the server (as recognition experiments can be expensive), as well as local access to the audio data.

Figure 5:
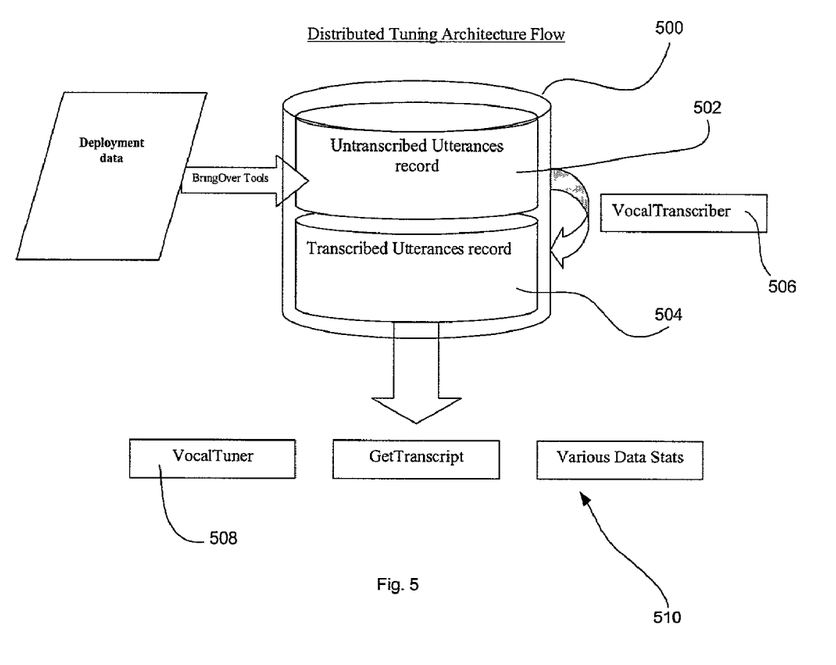
FIG. 5 is a schematic diagram illustrating the various features of the present invention.

FIG. 5 is a schematic diagram illustrating the various features of the present invention. As shown, a database 500 is provided with both untranscribed utterance records 502 and transcribed utterance records 504. To decrease the ratio of untranscribed utterance records 502 to transcribed utterance records 504, a vocal transcriber 506 is provided with an interface similar to that shown in FIG. 4. Further, a vocal tuner 508 is provided to facilitate the tuning process either local or abroad. Still yet, various other interfaces 510 may be provided for facilitating the overall process.

A novel approach is thus disclosed that drives the tuning process in a way that leverages the distributed architecture of the world-wide-web. It solves most of speech recognition tuning and data management issues by automating data retrieval. All human tasks involved can be performed through a web browser, thus leveraging untapped human resources. To take part in the process all one needs to have is a network connection with a web browser.

An exemplary speech recognition process will now be set forth. It should be understood that the present example is offered for illustrative purposes only, and should not be construed as limiting in any manner.

Figure 6:
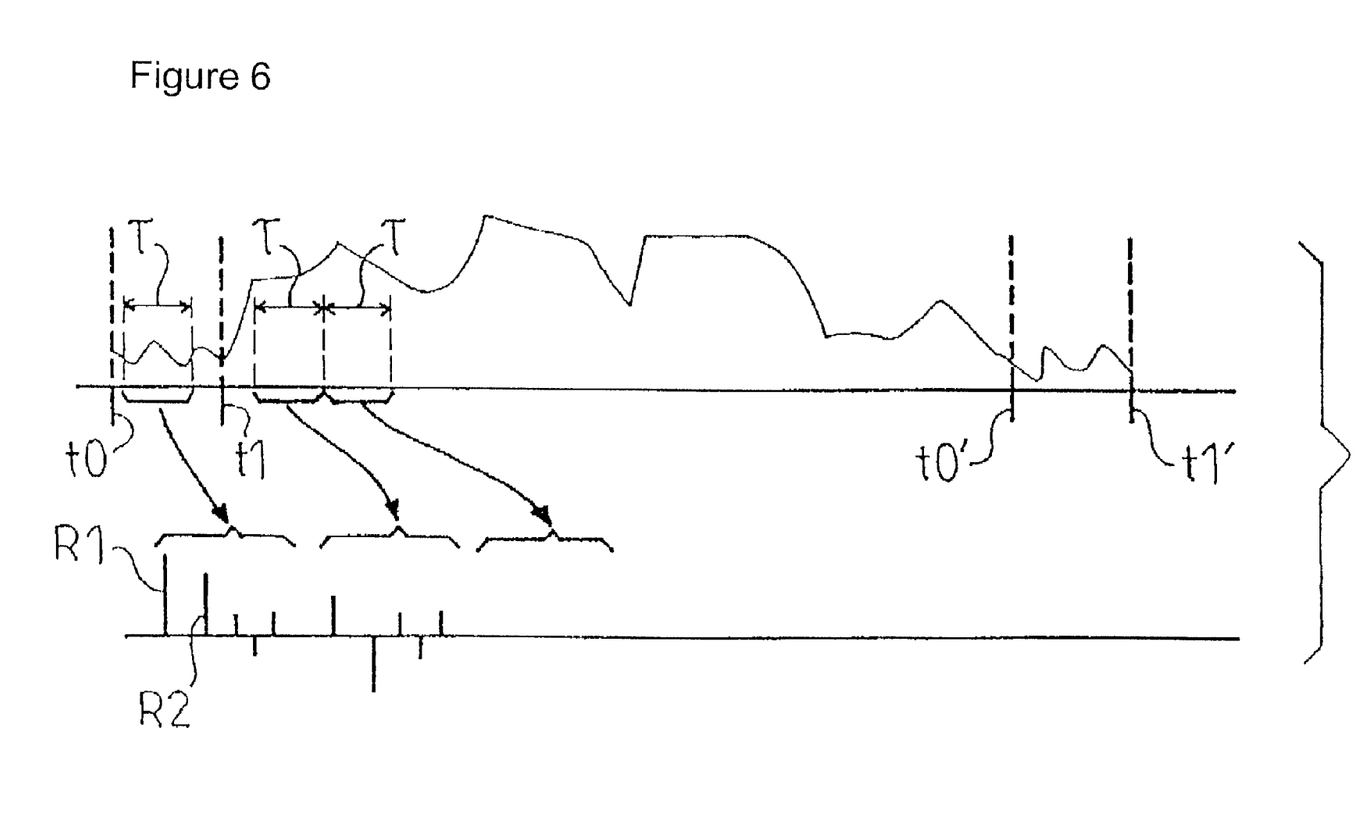
FIGS. 6–9 illustrate an exemplary speech recognition process, in accordance with one embodiment of the present invention.

FIG. 6 shows a timing diagram which represents the voice signals in A. According to the usual speech recognition techniques, such as explained in above-mentioned European patent, evolutionary spectrums are determined for these voice signals for a time tau represented in B in FIG. 6 by the spectral lines R1, R2 . . . . The various lines of this spectrum obtained by fast Fourier transform, for example, constitute vectors. For determining the recognition of a word, these various lines are compared with those established previously which form the dictionary and are stored in memory.

Figure 7:
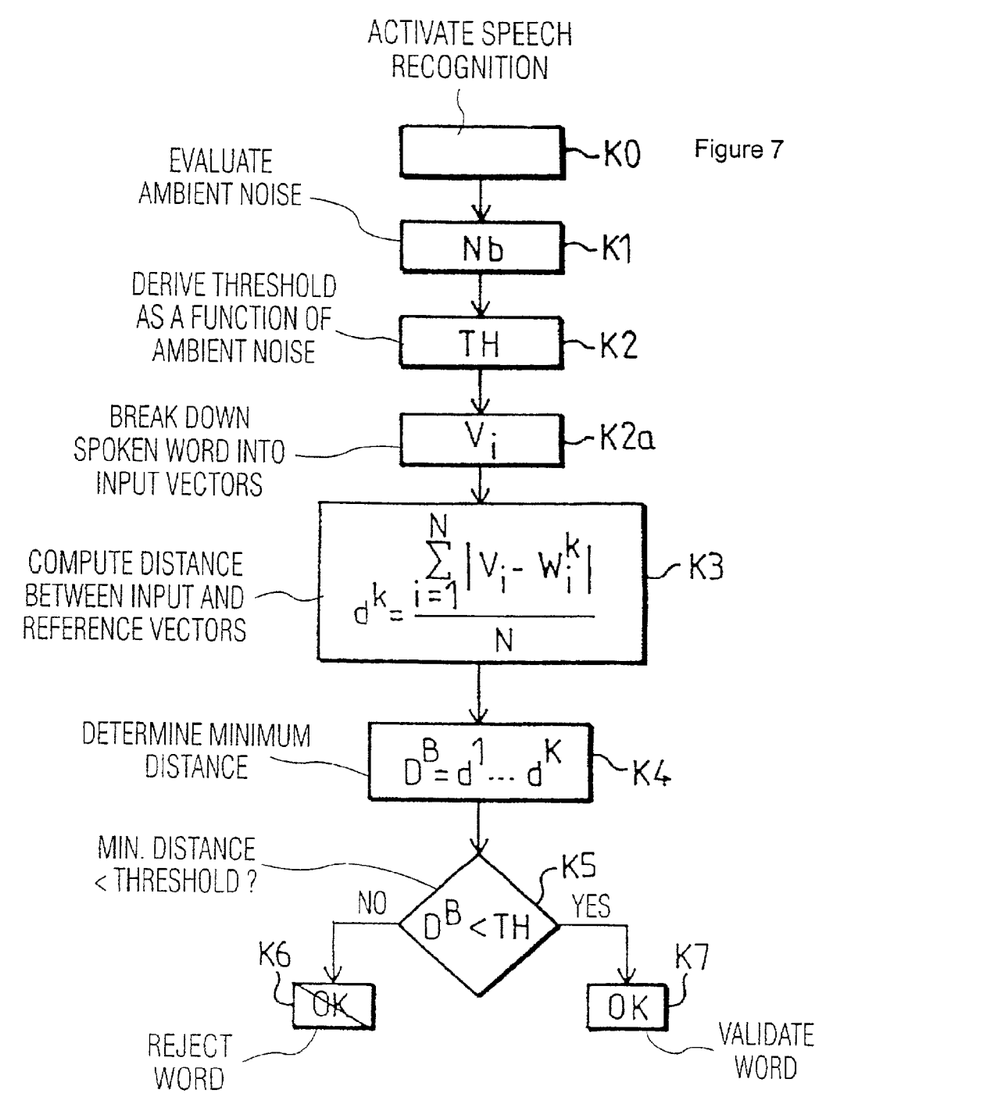
Figure 8:
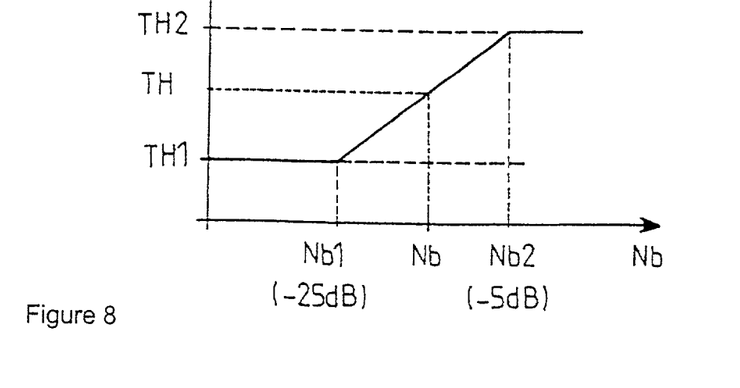

FIG. 7 shows the flow chart which explains the method according to the invention. Box K0 represents the activation of speech recognition; this may be made by validating an item on a menu which appears on the screen of the device. Box K1 represents the step of the evaluation of ambient noise. This step is executed between the instants t0 and t1 (see FIG. 6) between which the speaker is supposed not to speak, i.e. before the speaker has spoken the word to be recognized. Supposing Nb is this value which is expressed in dB relative to the maximum level (if one works with 8 bits, this maximum level 0 dB is given by 1111 1111). This measure is taken considering the mean value of the noise vectors, their moduli, or their squares. From this level measured in this manner is derived a threshold TH (box K2) as a function of the curve shown in FIG. 8.

Box K2a represents the breakdown of a spoken word to be recognized into input vectors $V_i$. Box K3 indicates the computation of the distances $d^k$ between the input vectors $V_i$ and the reference vectors $w^K_i$. This distance is evaluated based on the absolute value of the differences between the components of these vectors. In box K4 is determined the minimum distance $D^B$ among the minimum distances which have been computed. This minimum value is compared with the threshold value TH, box K5. If this value is higher than the threshold TH, the word is rejected in box K6, if not, it is declared recognized in box K7.

Figure 9:
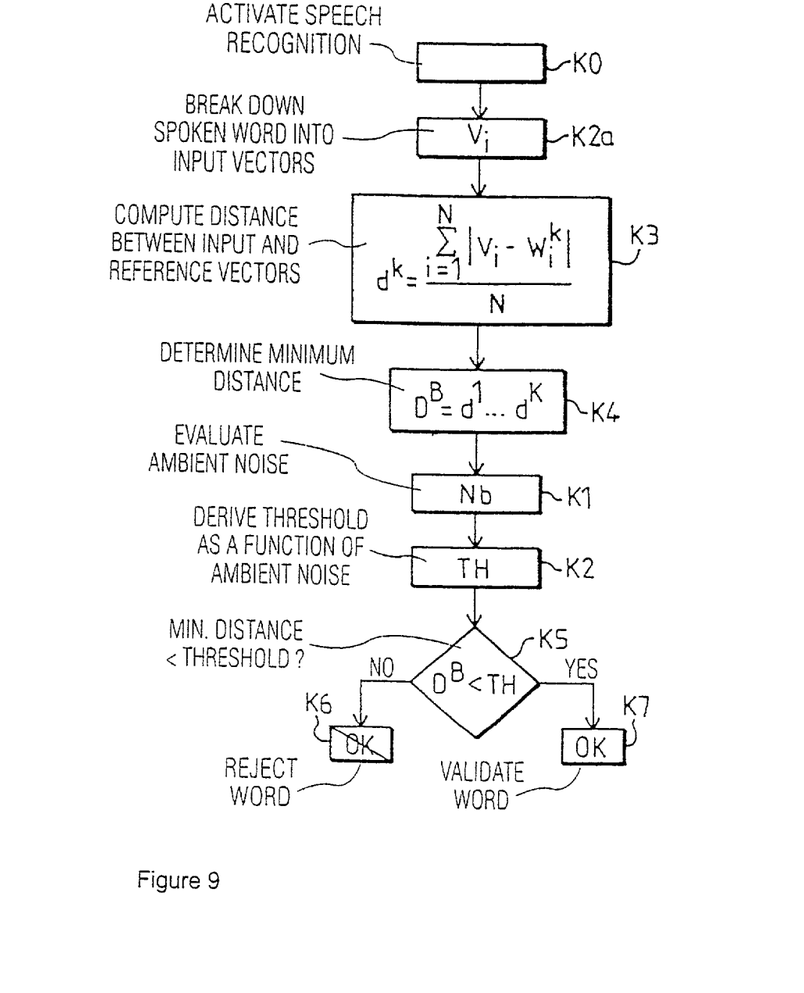

The order of various steps may be reversed in the method according to the invention. As this is shown in FIG. 9, the evaluation of the ambient noise may also be carried out after the speaker has spoken the word to be recognized, that is, between the instants t0' and t1' (see FIG. 6). This is trans-lated in the flow chart of FIG. 9 by the fact that the steps K1 and K2 occur after step K4 and before decision step K5.

The end of this ambient noise evaluation step, according to a characteristic feature of the invention, may be signaled to the speaker in that a beep is emitted, for example, by a loudspeaker which then invites the speaker to speak. The present embodiment has taken into account that a substantially linear function of the threshold value as a function of the measured noise level in dB was satisfactory. Other functions may be found too, without leaving the scope of the invention therefore.

If the distances vary between a value from 0 to 100, the values of TH1 may be 10 and those of TH2 80 for noise levels varying from −25 dB to −5 dB.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a transcription graphical user interface, comprising the steps of:
   (a) displaying an utterance icon for prompting the emission of an utterance via a speaker upon the selection thereof; and
   (b) depicting a transcription field for allowing entry of a transcription of the utterance utilizing a keyboard;
   (c) wherein the transcription graphical user interface is displayed using hypertext markup language (HTML);
   (d) wherein a comment field is depicted for allowing entry of comments associated with the transcription utilizing the keyboard;
   (e) wherein the comments include a performance of a transcriber in transcribing the utterance.

2. The method as recited in claim 1, wherein the transcription graphical user interface is capable of being displayed over a network utilizing a network browser.

3. The method as recited in claim 2, wherein the utterance is transmitted to a plurality of users utilizing the network browser.

4. The method as recited in claim 1, wherein a pair of selection icons are displayed for prompting the emission of previous and next utterances.

5. The method as recited in claim 1, wherein a hint is displayed corresponding to the utterance.

6. The method as recited in claim 5, wherein the hint corresponds to a word matched with the utterance utilizing a speech recognition process.

7. The method as recited in claim 1, wherein the transcription graphical user interface is in communication with a database containing untranscribed and transcribed utterance records.

8. The method as recited in claim 7, wherein the comments and utterance records are stored for facilitating a tuning of the utterance.

9. The method as recited in claim 1, wherein speech recognition is tuned utilizing the transcriptions.

10. A computer program product embodied in a computer readable-medium for providing a transcription graphical user interface, comprising:
   (a) computer code for displaying an utterance icon for prompting the emission of an utterance via a speaker upon the selection thereof; and (b) computer code for depicting a transcription field for allowing entry of a transcription of the utterance utilizing a keyboard;

wherein the transcription graphical user interface is displayed using hypertext markup language (HTML);

(d) wherein a comment field is depicted for allowing entry of comments associated with the transcription utilizing the keyboard;

(e) wherein the comments include a performance of a transcriber in transcribing the utterance.

11. The computer program product as recited in claim 10, wherein the transcription graphical user interface is capable of being displayed over a network utilizing a network browser.

12. The computer program product as recited in claim 10, wherein a pair of selection icons are displayed for prompting the emission of previous and next utterances.

13. The computer program product as recited in claim 10, wherein a hint is displayed corresponding to the utterance.

14. The computer program product as recited in claim 13, wherein the hint corresponds to a word matched with the utterance utilizing a speech recognition process.

15. A system for providing a transcription graphical user interface, comprising:

(a) logic for displaying an utterance icon for prompting the emission of an utterance via a speaker upon the selection thereof; and (b) logic for depicting a transcription field for allowing entry of a transcription of the utterance utilizing a keyboard;

(c) wherein the transcription graphical user interface is displayed using hypertext markup language (HTML);

(d) wherein a comment field is depicted for allowing entry of comments associated with the transcription utilizing the keyboard;

(e) wherein the comments include a performance of a transcriber in transcribing the utterance.

16. The system as recited in claim 15, wherein the transcription graphical user interface is capable of being displayed over a network utilizing a network browser.

17. The system as recited in claim 15 wherein a pair of selection icons are displayed for prompting the emission of previous and next utterances.

18. The system as recited in claim 15, wherein a hint is displayed corresponding to the utterance.

19. The system as recited in claim 18, wherein the hint corresponds to a word matched with the utterance utilizing a speech recognition process.

* * * * *